United States Patent
Varadamma et al.

(10) Patent No.: US 10,469,501 B2
(45) Date of Patent: Nov. 5, 2019

(54) MULTI-PROTOCOL ACCESS CONTROL LISTS

(71) Applicant: HEWLETT PACKARD ENTERPRISE DEVELOPMENT LP, Houston, TX (US)

(72) Inventors: Manoj Thankappan Varadamma, Bangalore (IN); Nandesh Palanisamy, Andover, MA (US); Roselle N. Fernandez, Fort Collins, CO (US); Matthew B. Dumm, Fort Collins, CO (US); Jonathan Wesley Hittle, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 206 days.

(21) Appl. No.: 15/603,731

(22) Filed: May 24, 2017

(65) Prior Publication Data
US 2018/0288057 A1 Oct. 4, 2018

(30) Foreign Application Priority Data
Mar. 31, 2017 (IN) .............................. 201741011629

(51) Int. Cl.
*H04L 29/06* (2006.01)
*G06F 21/62* (2013.01)
(52) U.S. Cl.
CPC ........ *H04L 63/101* (2013.01); *G06F 21/6218* (2013.01); *G06F 2221/2141* (2013.01); *H04L 63/08* (2013.01)

(58) Field of Classification Search
CPC .... H04L 63/08; H04L 63/101; G06F 21/6218
See application file for complete search history.

(56) References Cited

U.S. PATENT DOCUMENTS

| | | | |
|---|---|---|---|
| 5,761,669 A * | 6/1998 | Montague | G06F 21/604 707/758 |
| 6,651,096 B1 | 11/2003 | Gai et al. | |
| 7,512,990 B2 | 3/2009 | Haugh et al. | |
| 8,245,280 B2 | 8/2012 | Song et al. | |
| 8,429,192 B2 | 4/2013 | Burnett et al. | |
| 2001/0039622 A1 * | 11/2001 | Hitz | G06F 21/41 726/30 |
| 2005/0015674 A1 * | 1/2005 | Haugh | G06F 21/6236 714/38.1 |
| 2006/0123005 A1 * | 6/2006 | Burnett | G06F 21/6218 |

(Continued)

OTHER PUBLICATIONS

Kappes, G., Hatzieleftheriou, A., & Anastasiadis, S. V. (2013). Dike: Virtualization-aware Access Control for Multitenant Filesystems. University of Ioannina, Greece, Technical Report No. DCS2013-1, 8, 61-64. (Year: 2013).*

(Continued)

*Primary Examiner* — Robert B Leung
(74) *Attorney, Agent, or Firm* — Hewlett Packard Enterprise Patent Department

(57) ABSTRACT

Example implementations relate to multi-protocol access control lists. In an example, a multi-protocol access control list (ACL) is maintained in an extended attribute of an object stored in a file store. The multi-protocol ACL holds a primary ACL in a format associated with a primary protocol of a file store and a secondary ACL in a format associated with a secondary protocol.

20 Claims, 7 Drawing Sheets

(56) References Cited

U.S. PATENT DOCUMENTS

| | | | |
|---|---|---|---|
| 2009/0055397 A1 | 2/2009 | Man et al. | |
| 2009/0077087 A1* | 3/2009 | Urano | G06F 21/6218 |
| 2011/0125799 A1* | 5/2011 | Kandasamy | G06F 21/6218 707/785 |
| 2012/0109940 A1 | 5/2012 | Ishii et al. | |
| 2015/0135331 A1* | 5/2015 | Das | G06F 21/6218 726/27 |

OTHER PUBLICATIONS

Hitz, D., Allison, B., Borr, A., Hawley, R., & Muhlestein, M. (Aug. 1998). Merging NT and UNIX filesystem permissions. In Proceedings of the 2nd conference on USENIX Windows NT Symposium—vol. 2 (pp. 10-10). USENIX Association. (Year: 1998).*

Cannon. S., "Hewlett Packard Enterprise Unveils Most Significant 3PAR Flash Storage Innovations to Date," (Research Paper), Feb. 13, 2017, 6 pages, hpe.com/us/en/newsroom/news-archive/press-release/2017/02/1296749-hewlett-packard-enterprise-unveils-most-significant-3par-flash-storage-innovations-to-date.html.

IBM, "Managing Authorization and Access Control Lists," (Research Paper), Version 1.4.1, 2016, 3 pages, https://www.ibm.com/support/knowledgecenter/ST5Q4U_1.4.1/com.ibm.storwize.v7000.unified.141.doc/mng_authorization_topic_welcome.html.

Hewlett-Packard Development Company, L.P., "Technical overview of HP 3PAR File Persona Software Suite", Technical white paper, Dec. 2014, 19 pages.

Hewlett Packard Enterprise Development LP., "Data protection for HPE 3PAR File Persona Software with HPE Recovery Manager Central", Technical white paper, Feb. 2017, 13 pages.

Hewlett Packard Enterprise Development LP, "HPE 3PAR File Persona User Guide HPE 3PAR OS 3.2.2", Nov. 2015, 82 pages.

* cited by examiner

MULTI-PROTOCOL ACCESS CONTROL LISTS

BACKGROUND

A data center may include storage systems. Client devices may access the storage systems over network connections. Client devices may attempt to access file system objects stored on the storage systems. Storage systems may use access control lists to enforce permissions against attempted access by client devices.

BRIEF DESCRIPTION OF THE DRAWINGS

Various examples will be described below with reference to the following figures.

Throughout the drawings, identical reference numbers may designate similar, but not necessarily identical, elements.

DETAILED DESCRIPTION

Figure 1:
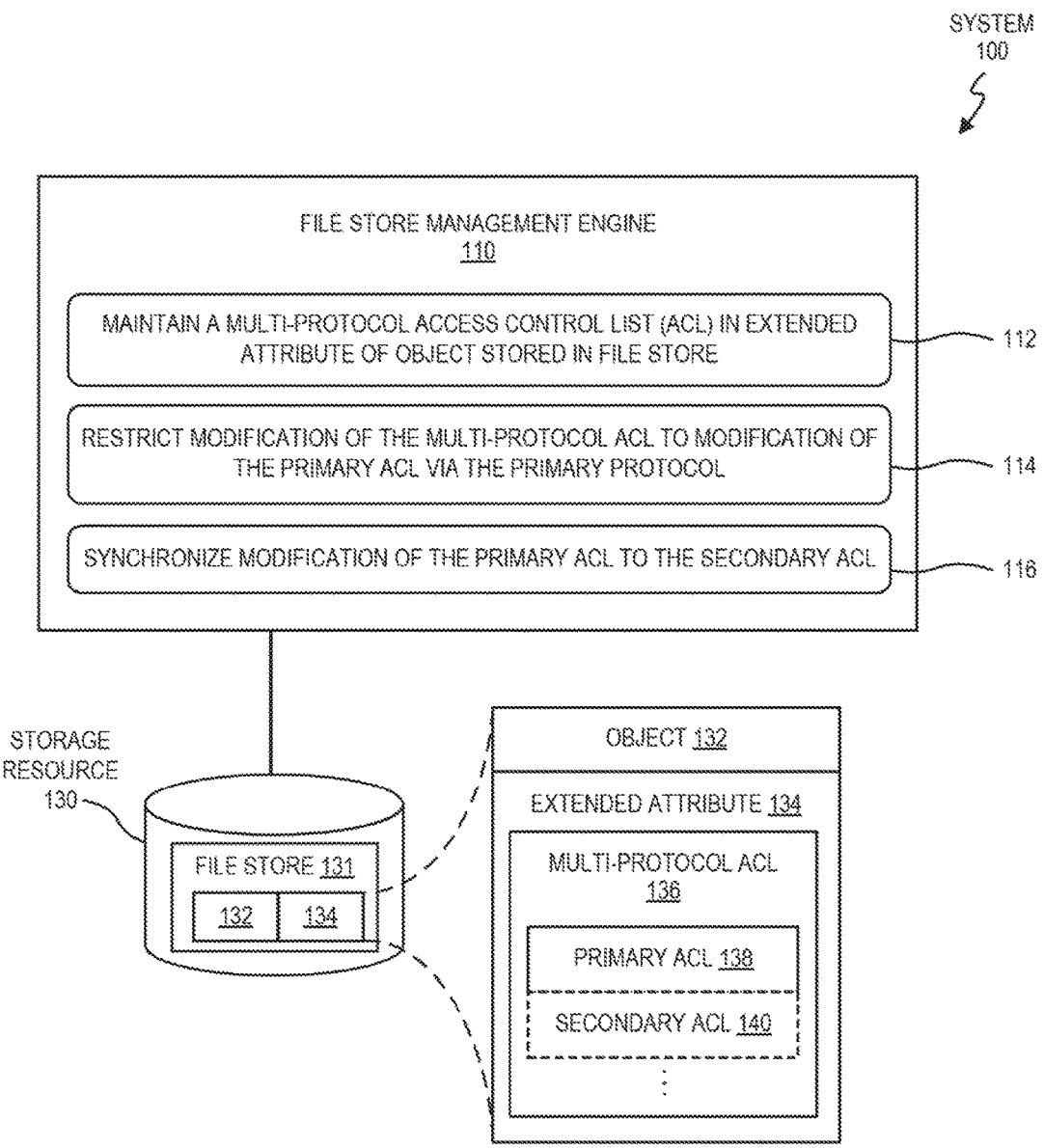
FIG. 1 is a block diagram depicting an example system that maintains persistent multi-protocol access control lists (ACLs).

Storage systems form part of data center infrastructure. Storage systems may store data and allow client devices, such as servers, workstations, desktop computers, to access the data. For example a storage system may have storage resources, such as hard disk drives, solid state drives, etc. Management and control features of the storage system may implement a logical arrangement to store data on the storage resources. For example, the logical arrangement may include components such as a file system, a virtual file server, a file store, and a file share, and these components may be organized in a directory hierarchy. A file store may contain file objects, such as file shares or sub-directories.

The file store may be configured to operate in a particular security mode. In some cases, a security mode may be associated with a primary protocol as an access protocol. For example, the file store may be configured to operate in a security mode related to the NTFS file system (also referred to herein as an "NTFS security mode" for convenience), which is associated with SMB (server message block) as the primary protocol. As another example, the file store may be configured to operate in a security mode related to POSIX® (also referred to as a "POSIX security mode" herein for convenience), which may be associated with NFS (network file system), FTP (file transfer protocol), or HTTP (hypertext transfer protocol) as a primary protocol.

Client devices, such as desktop or laptop computers or the like, may attempt access of objects of a file store over any wired and/or wireless network (e.g., Ethernet, optical fiber, Wi-Fi®, etc.) and via various access protocols. For example, client devices running WINDOWS® access the file store via the SMB (server message block) protocol. POSIX® client devices access the file store via NFS (network file system) protocol, FTP (file transfer protocol) or HTTP (hypertext transfer protocol). Access to a file object is enforced by an access control list (ACL) attached to that file object, where the ACL may specify security information such as users and the permissions granted to those users to perform operations on the file object.

However, different access protocols and security modes may each have different native ACL formats (i.e., different ways of storing user and permission information). For example, an NTFS ACL associated with the SMB access protocol may utilize a security identifier (SID) to identify a user or a group, while a POSIX ACL associated with the NFS access protocol may utilize a user identifier (UID) or a group identifier (GID) to identify a user or a group. Additionally, permissions may be denoted differently: an access control entry (ACE) in an NTFS ACL may include fourteen permissions while an ACE in a POSIX ACL may include three permissions. Additional protocols and ACL formats also may exist and exhibit differences. For example, some POSIX client devices may use an NFSv4 ACL, which may denote user identity as a user principal name (UPN).

Some storage systems may attempt to manage file object access via different protocols by storing and enforcing ACLs of each access protocol separately. Thus, it may be difficult for such a storage system to provide the same or similar permission enforcement experience to client devices accessing the same file object via different access protocols. Moreover, sub-optimal enforcement experience may arise for client devices accessing a file store using an access protocol that is different from the primary protocol associated with the security mode of the file store.

Other storage systems may attempt to coordinate ACLs of different access protocols through a number of format conversions whenever one ACL is changed. However, such coordination may be prone to inconsistencies among ACLs, particularly if a system failure occurs while format conversions are in progress, thus also resulting in an inconsistent enforcement experience.

Accordingly, it may be useful for a storage system to synchronize ACLs for a file object to provide the same or similar permission enforcement experience to each client device accessing the filing object, regardless of the access protocol of the client device. Examples disclosed herein may relate to, among other things, a multi-protocol ACL maintained in an extended attribute of an object stored in a file store of a storage system. The multi-protocol ACL includes a primary ACL in a format associated with a primary protocol of the file store's security mode and a secondary ACL in a format associated with a secondary protocol. Modification of the multi-protocol ACL is restricted to modification of the primary ACL via the primary protocol. Modifications of the primary ACL are synchronized to the secondary ACL.

By virtue of implementing a multi-protocol ACL as described herein, a storage system may provide a pure, uncompromised permission enforcement experience for client devices using the primary protocol related to the security mode of the file store, while also providing a similar enforcement experience to client devices using secondary protocols. In an example, the storage system will not provide more permissive access to an object than intended by the associated primary ACL. Additional useful aspects of the systems and methods of the present disclosure will be described further herein below.

Referring now to the figures, FIG. 1 is a block diagram depicting an example system 100 that maintains persistent multi-protocol ACLs. In some examples, the system 100 may serve as or form part of a storage system, which may be employed in a data center. The system 100 includes a file store management engine 110 and a storage resource 130.

The file store management engine 110 may be any combination of hardware and programming to implement the functionalities described herein. In some implementations, the programming may be processor executable instructions stored on a non-transitory machine-readable storage medium and the hardware may include at least one processing resource to retrieve and/or execute those instructions. Example processing resources include a microcontroller, a microprocessor, central processing unit core(s), an application-specific integrated circuit (ASIC), a field programmable gate array (FPGA), etc. Example non-transitory machine readable medium include random access memory (RAM), read-only memory (ROM), electrically erasable programmable read-only memory (EEPROM), flash memory, a hard disk drive, etc. The term "non-transitory" does not encompass transitory propagating signals. Additionally or alternatively, the file store management engine 110 may include electronic circuitry or logic for implementing functionality described herein. In some examples, a combination of hardware and programming may be used to implement the file store management engine 110 as a virtual machine running on hardware resources (e.g., processor and memory) of the system 100.

The file store management engine 110 may control how data are stored at and retrieved from the storage resource 130, which may include a storage device such as a hard disk drive, solid state drive, or the like, or a plurality of such storage devices (e.g., an array of disks). For example, the file store management engine 110 may implement a logical arrangement such as a directory hierarchy on the storage resource 130, and the file store 131 may serve as or form part of the directory hierarchy. The file store 131 may be configured to operate in a particular security mode, such as NTFS, POSIX, or the like.

The storage resource 130 may store file objects in a file store 131, such as file shares or directories. Object 132 may be one such file object. A file object, such as the object 132, may include metadata referred to as an extended attribute 134. The extended attribute 134 is stored on disk with the object 132. That is, the extended attribute 134 may be stored together with the object 132 in the file store 131 on the storage resource 130.

The file store 131 may be accessed by client devices using different access protocols, such as SMB, NFS, FTP, HTTP, etc. As described above, some of the different access protocols may define different corresponding ACL formats, particularly with respect to the format of user identity or identities and the format of permissions.

The file store management engine 110 may maintain 112 a persistent multi-protocol ACL 136 in the extended attribute 134 of the object 132 stored in the file store 131. The multi-protocol ACL 136 is persistent, in that it is stored and retained on disk on the storage resource 130, even when power to the storage resource 130 is shut off.

The multi-protocol ACL 136 is formatted to hold a primary ACL 138 in a format associated with a primary protocol of the file store 131 and a secondary ACL 140 in a format associated with a secondary protocol. For example, the multi-protocol ACL 136 may be stored in the extended attribute 134 as a contiguous buffer in packed form. In some implementations, the multi-protocol ACL 136 may be formatted as a header (which may be a fixed size, e.g., in bytes) and one or more ACL blocks (each of which may be variable size, e.g., in bytes, depending on the format of the corresponding ACL). In an example, the header may include a size field for each protocol supported by the file store management engine 110, where the size field for each protocol indicates the size of the ACL block for the corresponding protocol. Any size field being zero indicates the absence of a corresponding ACL block in the buffer that is the multi-protocol ACL 136. The primary ACL 138 and the secondary ACL 140 may each occupy separate ACL blocks.

The primary protocol is the access protocol associated with the security mode of the file store 131. An access protocol not associated with the security mode is deemed a secondary protocol. The primary ACL 138 includes an identity (user identity, group identity, and/or other identity information) and permissions in the format associated with the primary protocol, and the secondary ACL 140 includes an identity (user identity, group identity, and/or other identity information) and permissions in the format associated with the secondary protocol. Moreover, the secondary ACL is non-native to the primary protocol.

Thus, if the security mode is NTFS, the primary protocol is SMB and the primary ACL 138 is an NTFS ACL. At the same time, POSIX protocols (e.g., NFS, FTP, HTTP) may be secondary protocols and the corresponding secondary ACL 140 may be a POSIX ACL.

When written to the multi-protocol ACL 136, the primary ACL 138 and the secondary ACL 140 may include any security information associated with their respective protocols. For example, an NTFS ACL may include a full security descriptor (e.g., a security descriptor including a system access control list, SACL, and/or a discretionary access control list, DACL).

A multi-protocol ACL 136 includes a primary ACL 138 from the time the multi-protocol ACL 136 is created. When created, the multi-protocol ACL 136 may have a size field in the header for at least one secondary ACL 140, but may not hold a secondary ACL until a later time, such as upon first access of the multi-protocol ACL 136 by a client device via the secondary protocol. Creation of a multi-protocol ACL 136 will be described further herein below with respect to FIG. 2.

The file store management engine 110 also may restrict 114 modification of the multi-protocol ACL 136 to modification of the primary ACL 138 via the primary protocol. The engine 110 prevents modifications to the multi-protocol ACL 136 by the secondary protocol, that is, by any protocol other than the primary protocol. For example, in some implementations, the file store management engine 110 may ignore or reject secondary protocol requests from client devices to modify any part of the multi-protocol ACL 136. On the other hand, requests to modify the primary ACL 138 made by a client device via the primary protocol may be processed by the file store management engine 110. Example ACL modifications may include adding access control entries (ACE) to the primary ACL 138, changing ownership information, changing permissions, etc.

The file store management engine 110 also synchronizes 116 modification of the primary ACL 138 to the secondary ACL 140. For example, changes and modifications to the primary ACL 138 requested over the primary protocol are applied to the secondary ACL 140 also. In some implementations, the file store management engine 110 may access static translation mappings between the permission formats of the primary ACL 138 and the secondary ACL 140 to synchronize permission modifications of the primary ACL 138 to the secondary ACL 140. Additional aspects of synchronization, including modifications involving user identities (e.g., adding ACEs, changing ownership, etc.) will be described further herein below with respect to FIG. 2.

Figure 2:
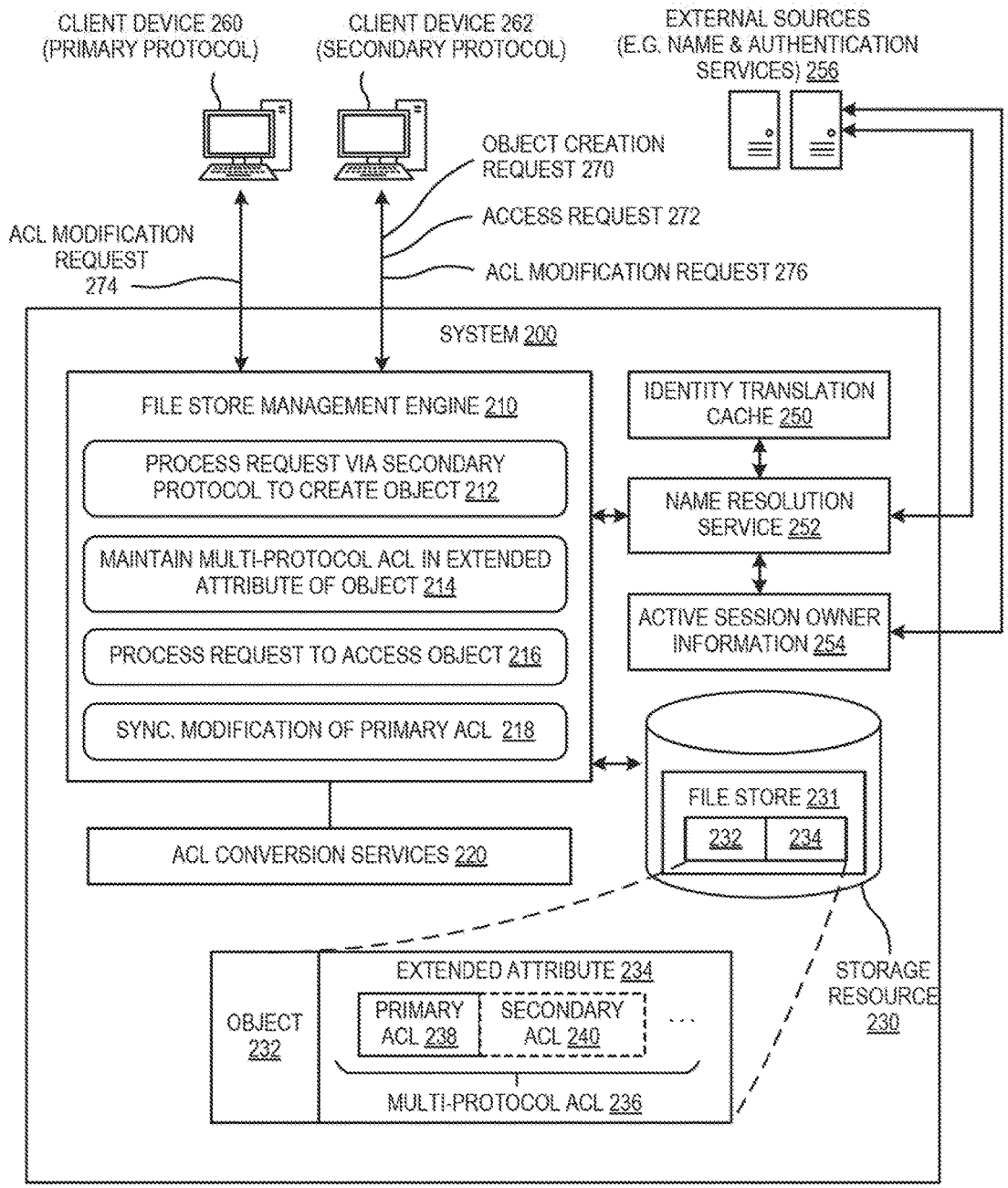
FIG. 2 is a block diagram depicting another example system that maintains persistent multi-protocol ACLs.

FIG. 2 is a block diagram depicting an example system 200 that maintains persistent multi-protocol ACLs. Similar to the system 100, the system 200 may serve as or form part of a storage system, which may be employed in a data center. Client devices 260 and 262 may communicate with the system 200, via a wired and/or wireless network. The client devices 260 and 262 may be, for example, desktop computers, laptops, workstations, servers, mobile devices, or the like. Although two client devices are depicted, more or fewer client devices may communicate with the system 200 in other cases.

The system 200 may communicate with external sources 256 via the wired and/or wireless network. The external sources 256 may be a computing system or systems (e.g., a server) that host name and/or authentication services. The external sources 256 may be accessed by the system 200 to authenticate and authorize any connection attempts by the client devices 260 and 262. The external sources 256 may include an Active Directory server or a Lightweight Directory Access Protocol (LDAP) server.

The system 200 includes a file store management engine 210 (also referred to herein as the engine 210) and a storage resource 230. Like the file store management engine 110, the file store management engine 210 may be any combination of hardware and programming and/or may include electronic circuitry or logic to implement the functionalities described herein. In some examples, a combination of hardware and programming may be used to implement the file store management engine 210 as a virtual machine running on hardware resources (e.g., processor and memory) of the system 200. The storage resource 230, like the storage resource 130, may include a storage device such as a hard disk drive, solid state drive, or the like, or a plurality of such storage devices (e.g., an array of disks).

The file store management engine 210 may maintain a file store 231 on the storage resource 230, which is analogous in many respects to the file store 131. For example, the file store 231 may be configured to operate in a particular security mode, such as NTFS, POSIX, or the like, and the file store 231 may contain file objects, such as object 232. The file store management engine 210 may maintain multiple file stores on the storage resource 230. The object 232 may include metadata referred to as an extended attribute 234, which is stored on disk together with the object 232.

In some implementations, the system 200 may also include an identity translation cache 250, a name resolution service 252, and a cache of active session owner information 254. The cache of active session owner information 254 may store information related to authentication of client devices (e.g., access tokens containing SIDs, from an Active Directory server), and thus may include information about a user identity. The identity translation cache 250 may store user identities in multiple formats, specifically, in formats associated respectively with a primary protocol and a secondary protocol, thus allowing a user identity to be translated (e.g., UID to SID. GID to SID, and vice versa). The cache of active session owner information 254 and the identity translation cache 250 may each be implemented independently in memory or storage of the system 200, for example.

The name resolution service 252 may perform lookups of user identity from the identity translation cache 250 or the external sources 256, and may also manage the identity translation cache 250 by adding new entries, clearing entries, and reporting on cache efficiency. In some implementations, the name resolution service 252 may be any combination of hardware and programming to perform the functions described, and may be implemented as a daemon of the system 200. For example, the engine 210 may be a kernel module residing in kernel space of a virtual machine running on hardware of the system 200, and the name resolution service 252 may be a daemon (programming executed on hardware) in the user space of the virtual machine. In such an example, the engine 210 may access or call, via a netlink socket based interface, the name resolution service 252 to perform lookups.

To illustrate multi-protocol ACL management by the system 200, the example client devices 260 and 262 depicted utilize different file access protocols when communicating with the system 200. The client device 260 utilizes a primary protocol, which is associated with the security mode of the file store 231. The client device 262 utilizes a secondary protocol, which is not associated with the security mode. For example, if the security mode of the file store 231 is NTFS, the client device 260 uses SMB as the primary protocol, and the client device 262 uses a POSIX protocol (e.g., NFS, FTP, HTTP) which is a secondary protocol. In the examples that follow, the client devices 260 and 262 are assumed to have been authenticated to the system 200 as appropriate for their respective protocols (e.g., via Active Directory or LDAP authentication).

Various aspects of a multi-protocol ACL 236, such as creation, enforcement, and synchronization, will now be described. Many aspects of the multi-protocol ACL 136, the primary ACL 138 and the secondary ACL 140 of FIG. 1 also may apply to the multi-protocol ACL 236, the primary ACL 238, and the secondary ACL 240, respectively. For example, the multi-protocol ACL 236 may be formatted in a similar manner to the multi-protocol ACL 126 as described above (e.g., a header with ACL size fields and ACL blocks, packed in a contiguous buffer).

The multi-protocol ACL 236 includes at least a primary ACL 238 and also may include a secondary ACL 240. The multi-protocol ACL 236 is written atomically into the extended attribute 234 associated with the object 232. An atomic write may refer to a transaction where all data are written, or none of the data are written (e.g., in the case of a power failure or a system crash). To illustrate, if a primary ACL 238 and a secondary ACL 240 are to be written together as the multi-protocol ACL 236 to the extended attribute 234, then either both the primary ACL 238 and the secondary ACL 240 are written or the extended attribute 234 remains unchanged (i.e., as it was as if the write was not attempted), but in no case would either the primary ACL 238 or the secondary ACL 240 be written without the other.

The client devices 260 and 262, under control of a user or by automation, may transmit a request from their respective protocols to create an object (e.g., 232) in the file store 231. The object may be a file share or a directory or a file, for example. The request may indicate the name of the object to be created and a name of the parent object (e.g., a directory in which to create the object). The multi-protocol ACL 236 is created along with the object 232.

For example, the client device 262 may send an object creation request 270 via the secondary protocol. In response, the file store management engine 210 processes 212 the request received from the client system 262 via the secondary protocol to create the object 232 as follows. The file store management engine 210 creates the primary ACL 232 based on object creation rules of the primary protocol and a parent object identified by the request. Then the engine 210 performs an atomic write operation that stores, to the extended attribute 234 of the object 232, the multi-protocol ACL 236 containing the created primary ACL 238 alone without a secondary ACL 240. In an implementation where the multi-protocol ACL 236 includes a header with size fields, the size field corresponding to the secondary ACL 240 (and any other secondary ACLs) may be zero.

The client device 260 also may send an object creation request, via the primary protocol. The file store management engine 210 responds in a manner similar to the response to request 270. The file store management engine 210 processes the request by creating a primary ACL 232 based on object creation rules of the primary protocol and the parent object, and by atomically writing the primary ACL 232 into the multi-protocol 236 without any secondary ACL.

Object creation rules may include inheritance rules. Inheritance rules may specify how an ACL of the parent object (identified by the creation request) is to be inherited by the primary ACL 232. For example, inheritance rules may describe what can be inherited, what cannot be inherited, and any special processing during inheritance. A primary ACL 232 may inherit security information from the parent object ACL, such as a user identity (or identities) and permissions. Thus, when creating a primary ACL 232 and thereby a multi-protocol ACL 236, the system 200 may leverage an existing user identity of the parent object ACL, without looking up identity translations via the external sources 256. Depending on the protocol, other protocol-specific object creation rule semantics such as creation masks may determine the ACL of the new object.

Moreover, by virtue of processing an object creation request in the manner described above, every multi-protocol ACL maintained by the system 200 (e.g., for a plurality of objects in the file store 231) has a primary ACL native to the security mode of the file store 231, regardless of whether the creation request was from the primary protocol or a secondary protocol. After a multi-protocol ACL 236 is created, it is maintained 214 and persists in the extended attribute 234 of the object 232, until the object 232 is deleted or otherwise removed.

The client devices 260 and 262, under control of a user or by automation, may transmit a request to access an existing object in the file store 231. The access requested may relate to an attempt to perform an action on the object identified by the request, such as read, write, or execute actions, although the specific action may vary depending on the protocol of the request. As will be described below, the file store management engine 210 receives and evaluates the access request, and when possible, enforces a corresponding ACL against the access request.

ACL enforcement, as referred to herein, may generally include checking if a user identity of the access request matches a user identity in the ACL, and if so, checking if the requested action of the access request is permitted by the permissions for the matched user identity in the ACL. If both conditions are fulfilled, then the access request is carried out on the object. If either the user identity is not found or the action is not permitted, access is denied.

To illustrate handling of access requests, consider that the client device 260 may transmit an access request to access the object 232 via the primary protocol. By virtue of the multi-protocol ACL 236 being created with a primary ACL 238 (e.g., by process 212), the file store management engine 210 may enforce the primary ACL 238 against the access request.

In other examples, the client device 262 may transmit a request 272 to access the object 232 via a secondary protocol. The file store management engine 210 receives the access request 272 via the secondary protocol and determines whether the multi-protocol ACL 236 in the extended attribute 234 for the object 232 has a secondary ACL 240 for the secondary protocol of the access request 272.

In some instances, the multi-protocol ACL 236 for the object 232 does not include an ACL in a format associated with the secondary protocol of the access request 272. Thus, that secondary protocol may be deemed a new secondary protocol in such cases. For example, after creation, the multi-protocol ACL 236 may not include any secondary ACLs. As another example, the multi-protocol ACL 236 may contain a secondary ACL, but the access request 272 comes from a new secondary protocol that is different from the secondary protocol associated with the secondary ACL already contained in the multi-protocol ACL 236. In the following illustration regarding an access request 272, consider that the secondary protocol of the client device 262 is new with respect to the multi-protocol ACL 236.

The file store management engine 210 may process 216 the request 272 from a client device (e.g., 262) via a new secondary protocol to access the object 232 when the multi-protocol ACL 236 does not include an ACL in a format associated with the new secondary protocol in the following manner. The file store management engine 210 converts the primary ACL 238 to a new secondary ACL 240, which includes conversion of a user identity and permissions included in the primary ACL 238 to a user identity and permissions in the format associated with the new secondary protocol. In some implementations, the file store management engine 210 may call the name resolution service 252 to attempt identity conversion. In other implementations, the file store management engine 210 may itself carry out the functions of the name resolution service 252 described below.

The name resolution service 252 may first attempt to retrieve the user identity in the format associated with the new secondary protocol from the identity translation cache 250. For example, conversion information for the identity may have been previously stored for converting between the primary protocol and the new secondary protocol when creating a secondary ACL for the new secondary protocol for a different object on the file store 231.

If the user identity in the new secondary protocol format cannot be retrieved from the identity translation cache 250, the name resolution service 252 may lookup the user identity in the format associated with the new secondary protocol from an external source 256. The name resolution service 252 may add conversion information from the lookup to the identity translation cache 250 for future conversions.

If the user identity in the new secondary protocol format cannot be retrieved from the identity translation cache 250 or from an external source 256, the name resolution service 252 may attempt to determine the user identity from active session owner information 254 (e.g., if the new secondary protocol is SMB). If the user identity in the new secondary protocol format cannot be retrieved from any of the foregoing sources, the name resolution service 252 may add the attempted lookup to a negative cache to avoid further lookups for a time, which may be useful to avoid repeated attempts in the case of a connection failure with the external sources 256 for example.

Accordingly, the name resolution service 252 can perform lookups from the identity translation cache 250, the external sources 256, or the active session owner information 254 to translate user identifier (UID) to user principal name (UPN), group identifier (GID) to UPN, security identifier (SID) to UPN, UPN to SID, UPN to UID, UPN to GID, UID to SID, GID to SID, SID to UID, and SID to GID. The direction of the translation depends on what protocol is the primary protocol and what protocol is the secondary protocol.

Conversion of the primary ACL 238 to a new secondary ACL 240 may also include conversion of permissions of the primary ACL to a format that is compliant with the secondary protocol. The file store management engine 210 may use static translation mappings between the permission formats of the primary ACL 238 and the new secondary ACL 240 to perform the conversion (e.g., a POSIX to NTFS conversion, a NTFS to POSIX conversion, etc.). The static translation mappings may be implemented as part of kernel modules in a set of ACL conversion services 220. For example, the ACL conversion services 220 may be implemented as kernel modules.

Once a new secondary ACL 240 has been constructed from the conversions of user identity and the permissions from the primary ACL 238 as described above, the new secondary ACL 240 is atomically written together with any pre-existing ACLs of the multi-protocol ACL 236 (e.g., at least the primary ACL 238) into the extended attribute 234 of the object 232. In this manner, a secondary ACL 240 may be created upon first access of the object 232 by the corresponding secondary protocol.

Once the secondary ACL 240 has been created, or if a secondary ACL 240 already existed in the multi-protocol ACL 236 (owing to a previous access), the file store management engine 210 can respond to an access request (like 272) from the secondary protocol by enforcing the secondary ACL 240 against the access request 272 without conversion of the primary ACL 238, because the secondary ACL 240 is on disk in the file store 231 and the user identity and permission information are available. By virtue of storing the secondary ACL 240 in the extended attribute 234, the system 200 may offer improved performance to accesses by secondary protocols in contrast to storage systems that rely on on-the-fly conversion of native ACLs to a format of a secondary protocol upon access by the secondary protocol.

The file store management engine 210 also may manage requests to modify ACLs. ACL modification requests may seek to add security information (e.g., an ACE that includes new user identity and permissions), change permissions, change ownership, etc. The file store management engine 210 may restrict modification of the multi-protocol ACL 236 to modification of the primary ACL 238 via the primary protocol. For example, the file store management engine 210 may process an ACL modification request 274 from the client device 260 via the primary protocol and may ignore or reject an ACL modification request 276 from the client device 262 via the secondary protocol.

Any changes made to the primary ACL 238 by a request 274 may be synchronized 218 by the file store management engine 210 to the secondary ACL 240. For example, to process an identity-based modification to the primary ACL, such as adding a new user identity and permissions, the engine 210 may convert the new user identity and permissions to secondary ACL formats, which may include invoking the name resolution service 252 to convert the new user identity (which in turn may refer to the identity translation cache 250 independent of external sources 256, initially) and converting permissions via static translation mappings.

In some implementations, the file store management engine 210 synchronizes 218 modifications of the primary ACL 238 to the secondary ACL 240 by first invalidating the secondary ACL 240 and updating the primary ACL 238 according to the request 274. Then at a later time after the invalidation, the engine 210 responds to a subsequent access request via the secondary protocol by converting the modified primary ACL to a modified secondary ACL and atomically rewriting the multi-protocol ACL with the modified primary and secondary ACLs.

Figure 3:
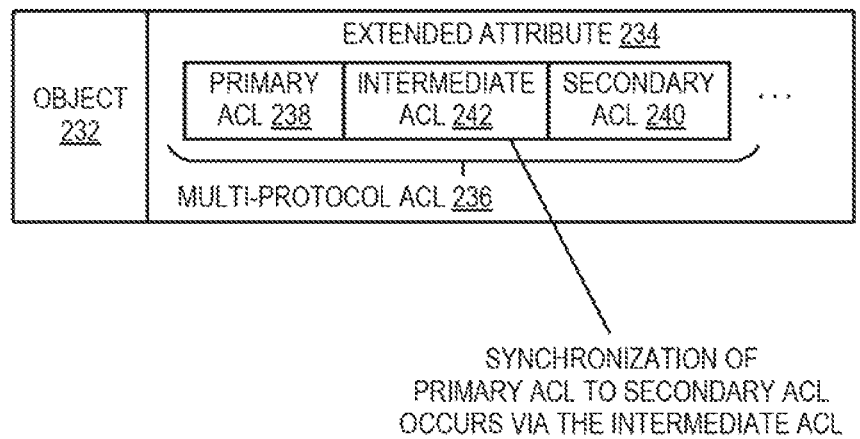
FIG. 3 depicts an example multi-protocol ACL with an intermediate ACL.

In some implementations, the file store management engine 210 may also include an intermediate ACL in each multi-protocol ACL. For example, the intermediate ACL may be included in the multi-protocol ACL at the time of creation. In other examples, the intermediate ACL may be created upon a first access request by a secondary protocol. FIG. 3 depicts an example multi-protocol ACL 236 that includes a primary ACL 238, a secondary ACL 240, and an intermediate ACL 242. Additional secondary ACLs may also be included in the multi-protocol ACL 236 in other examples as depicted by ellipses. The multi-protocol 236 of FIG. 3 is stored in an extended attribute 234 of an object 232.

The intermediate ACL 242 may be protocol-agnostic. In some implementations, the intermediate ACL 242 may be similar to an NFSv4 format, with user identity stored as UID/GID. The intermediate ACL 242 may serve as an intermediary for conversion from the primary ACL 238 to the secondary ACL 240 (e.g., when creating the secondary ACL 240 or when synchronizing modifications of the primary ACL 238 to the secondary ACL 240).

For example, synchronization (e.g., 218) may include implementation (execution) of the modification to the primary ACL 238 to generate a modified primary ACL; conversion of the modified primary ACL to a modified intermediate ACL; conversion of the modified intermediate ACL to a modified secondary ACL; and an atomic write to the extended attribute 234 of the object 232 of an updated multi-protocol ACL containing the modified primary ACL, the modified intermediate ACL, and the modified secondary ACL. In other implementations of synchronization 218, a modification to the primary ACL 238 may cause the engine 210 to invalidate the secondary ACL 240 and the intermediate ACL 242, and the engine 210 converts the modified primary ACL to a modified intermediate ACL and converts the modified intermediate ACL to a modified secondary ACL responsive to a subsequent access request from the secondary protocol after the invalidation.

The intermediate ACL 242 may facilitate extensibility of the file store management engine 210, and thus the system 200, to support new access protocols, security modes, and ACL formats. For example, the file store management engine 210 may add support for a new ACL format by reformatting the multi-protocol ACL 236 header to include information for the new ACL format (e.g., a new size field), addition of a routine to convert from the new ACL format to a format of the intermediate ACL, and addition of a routine to convert from the format of the intermediate ACL to the new ACL format.

In some implementations, the added routines may be stored to a library of the ACL conversion services 220. The added routines may include, for example, new kernel modules to perform translation mappings for permission conversion. In some implementations, the name resolution service 252 also may be updated with routines to convert user identities of the new ACL format.

By virtue of converting ACLs through the intermediate ACL, the number of conversion services may be reduced compared to the number of services involved in converting directly between each protocol ACL without an intermediate ACL. For example, if the file store management engine 210 can handle N-number of protocols, adding support for a new protocol via the intermediate ACL format would add two conversion services to convert the new protocol ACL to the intermediate ACL and convert the intermediate ACL to the new protocol ACL. On the other hand, using direct conversions without an intermediate ACL format would add 2N number of conversion services to convert from each of N-number of existing protocol ACLs to the new protocol ACL and from the new protocol ACL to each of the N-number of existing protocol ACLs.

Figure 4:
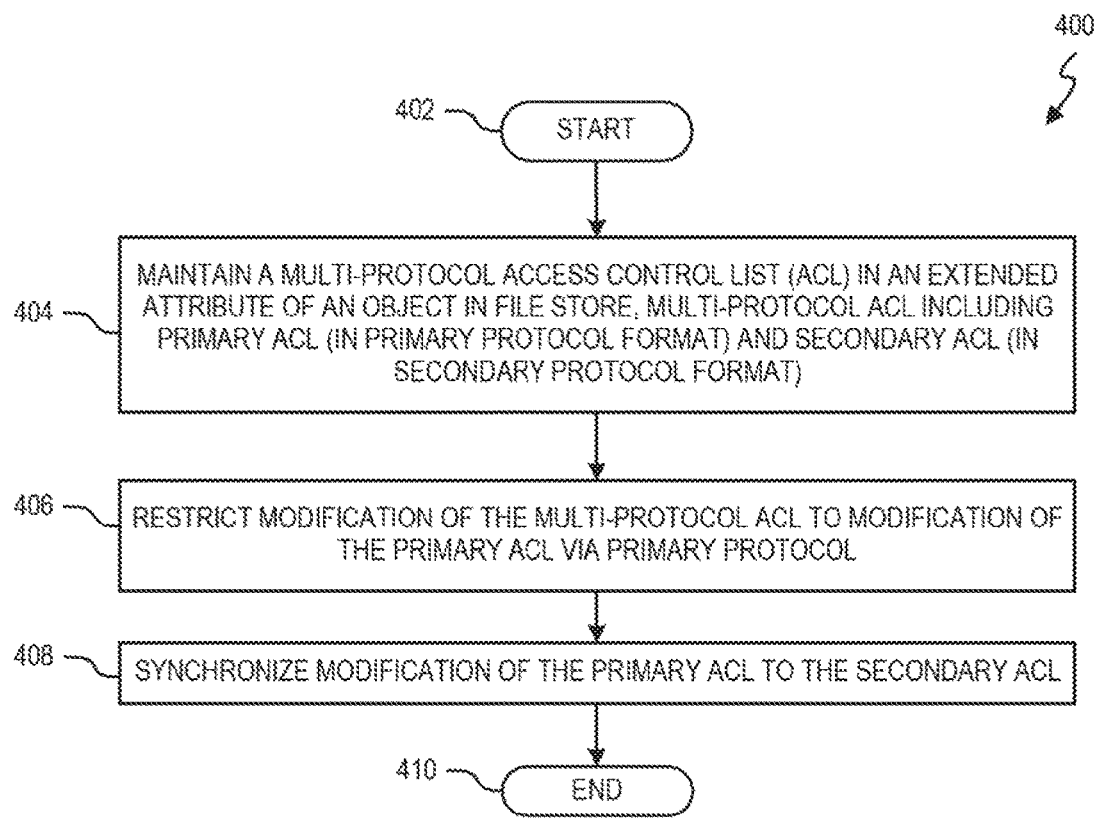
FIG. 4 is a flow diagram depicting an example method that maintains a multi-protocol ACL.
Figure 5:
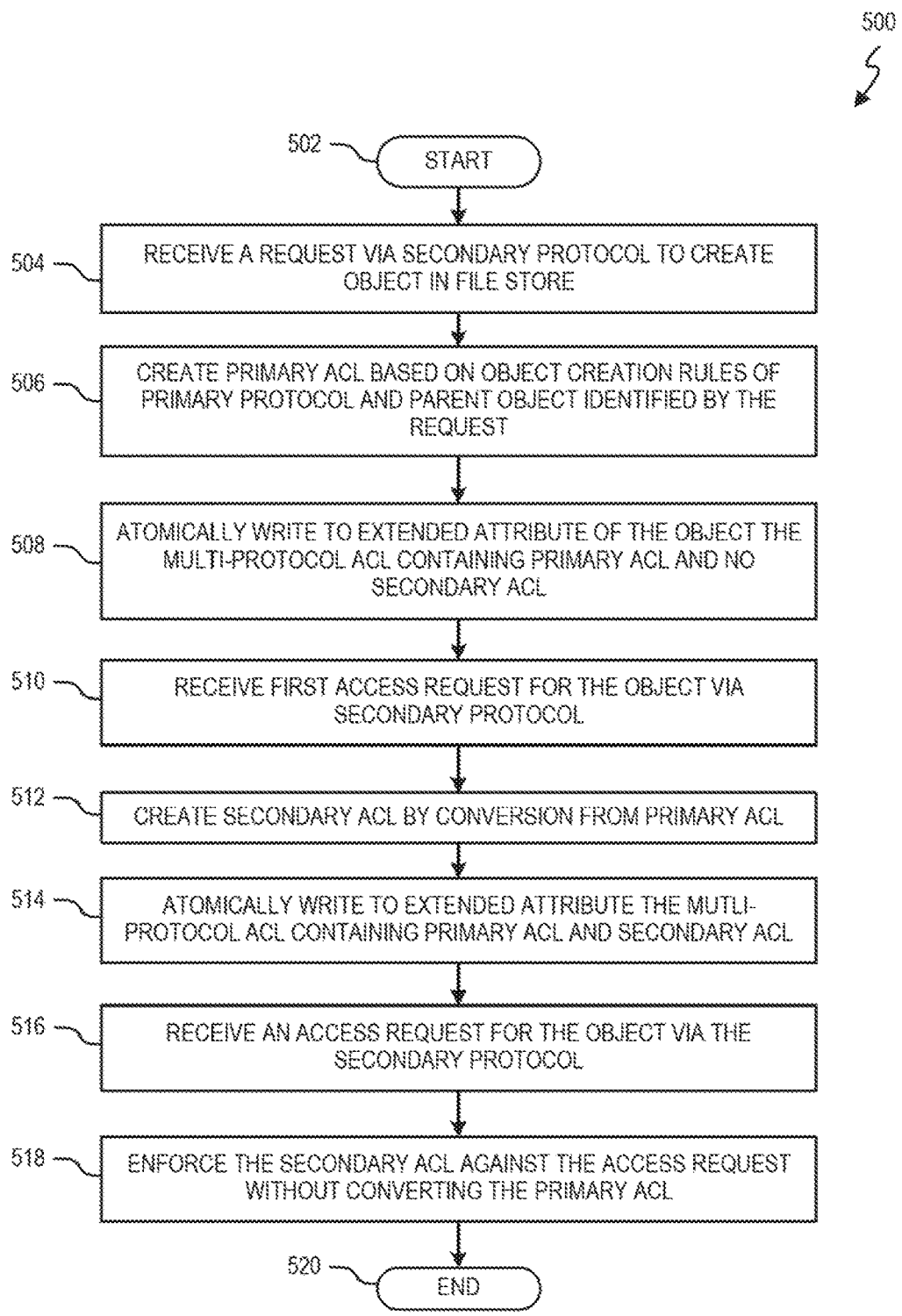
FIG. 5 is a flow diagram depicting an example method that creates a primary ACL in response to a request via a secondary protocol to create an object.
Figure 6:
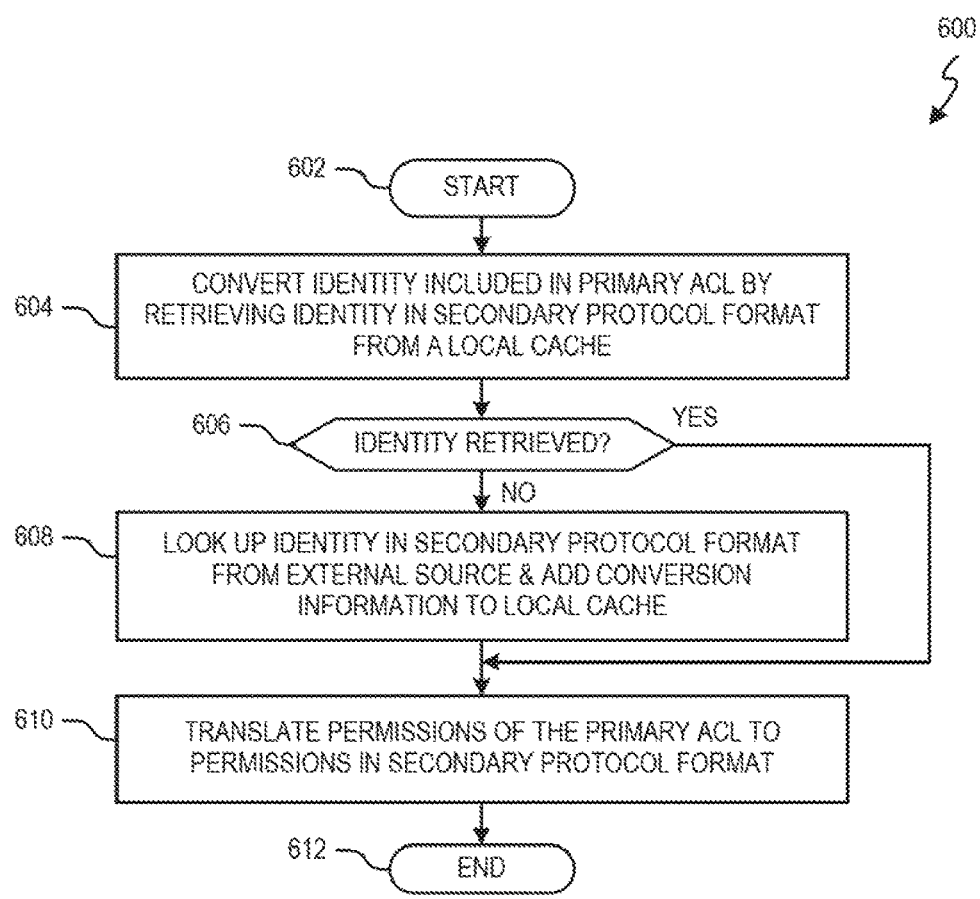
FIG. 6 is a flow diagram depicting an example method that converts an identity included in a primary ACL.

FIGS. 4-6 are flow diagrams depicting various example methods. In some implementations, one or more blocks of a method may be executed substantially concurrently or in a different order than shown. In some implementations, a method may include more or fewer blocks than are shown. In some implementations, one or more of the blocks of a method may, at certain times, be ongoing and/or may repeat. The methods may be implemented in the form of executable instructions stored on a machine readable medium and executed by a processing resource and/or in the form of electronic circuitry.

The methods described below are described as being performed by a storage system. In some examples, storage system 100 or 200 described above or storage system 700 described below may perform the methods. However, in other examples, a method may be performed by another storage system.

FIG. 4 is a flow diagram depicting an example method 400 that maintains a multi-protocol ACL. Method 400 begins at block 402 and continues to block 404, where a storage system maintains a multi-protocol ACL (e.g., 138) in an extended attribute (e.g., 134) of an object (e.g., 132) stored in a file store (e.g., 131) of the storage system (e.g., 100). The multi-protocol ACL includes a primary ACL (e.g., 138) in a format associated with a primary protocol of the file store (or specifically, of the file store's security mode) and a secondary ACL (e.g., 140) in a format associated with a secondary protocol. In an example, block 402 may be performed for the maintain function 112 of the file store management engine 110.

At block 406, the storage system restricts modification of the multi-protocol ACL to modification of the primary ACL via the primary protocol. In an example, block 406 may be performed for the restrict function 114 of the file store management engine 110. At block 408, the storage system synchronizes modification of the primary ACL to the secondary ACL. In some implementations, synchronization at block 406 may include updating the primary ACL according to the modification and invalidating the secondary ACL, and then responsive to a request to access the object via the secondary protocol, updating the secondary ACL by converting the updated and modified primary ACL. In an example, block 408 may be performed for the synchronize function 116 of the file store management engine 110. At block 410, method 400 ends.

FIG. 5 is a flow diagram depicting an example method 500. Method 500 begins at block 502 and proceeds to block 504, where a storage system (e.g., 200) receives a request (e.g., 270) via the secondary protocol to create an object (e.g., 232) in a file store (e.g., 231).

Responsive to the request, the storage system creates a multi-protocol ACL (e.g., 236) as follows. At block 506, the storage system creates a primary ACL (e.g., 238) based on object creation rules of the primary protocol and a parent object identified by the request. At block 508, the storage system atomically writes, to an extended attribute (e.g., 234) of the object, the multi-protocol ACL containing the primary ACL created at block 506 and no secondary ACL. In some implementations, blocks 504-508 may be performed before block 404 of method 400. In an example, by the engine 210 may perform blocks 504-508 to perform the function 212.

At block 510, the storage system receives a first access request (e.g., 272) for the object via the secondary protocol, after creating the multi-protocol ACL via blocks 504-508. Responsive to the first access request, at block 512, the storage system creates a secondary ACL (e.g., 240) by conversion from the primary ACL. At block 514, the storage system atomically writes, to the extended attribute of the object, the multi-protocol ACL containing the primary ACL and the secondary ACL created at block 512. In an example, the engine 210 may perform blocks 510-514 to perform the function 216.

At block 516, the storage system receives an access request for the object via the secondary protocol. At block 518, the storage system enforces the secondary ACL against the access request, and without converting the primary ACL. At block 520, method 500 ends.

FIG. 6 is a flow diagram depicting an example method 600. In some implementations, method 600 may be useful for implementing at least part of block 512 of method 500.

Method 600 begins at block 602 and continues to block 604, where the storage system (e.g., 200) converts an identity included in a primary ACL (e.g., 238) to an identity in a format associated with a secondary protocol, by retrieving the identity in the format associated with the secondary protocol from a local cache (e.g., identity translation cache 250).

If the identity in the format associated with the secondary protocol cannot be retrieved from the local cache ("NO" at block 606), the storage system performs block 608 to look up the identity in the format associated with the secondary protocol from a source (e.g., 256) external to the storage system and adds conversion information for the identity to the local cache. If the identity can be retrieved from the local cache ("YES" at block 606), the storage system proceeds directly to perform block 610 without performing block 608.

At block 610, the storage system translates permissions of the primary ACL to permissions in the format associated with the secondary protocol. At block 612, method 600 ends.

Figure 7:
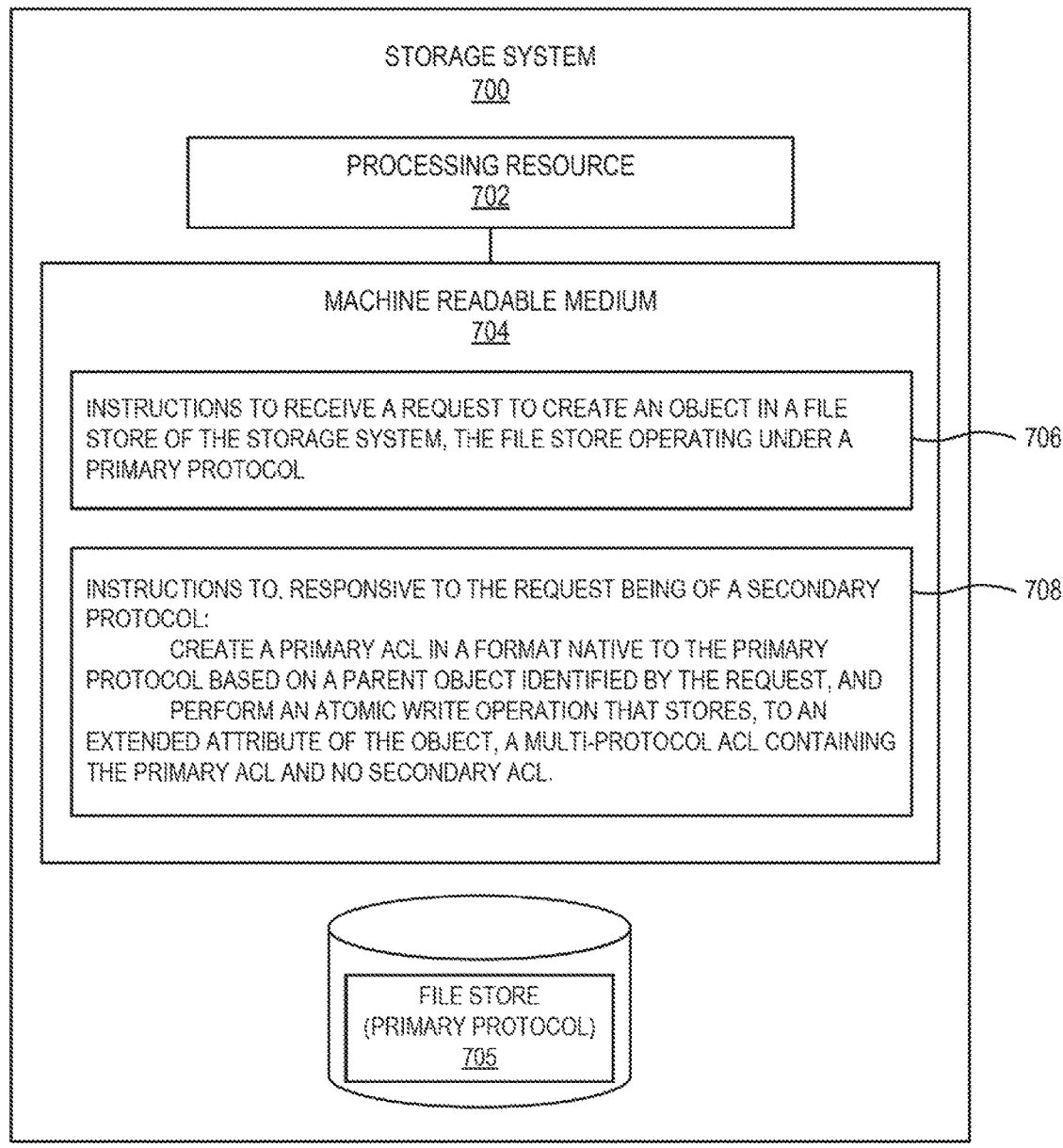
FIG. 7 is a block diagram of an example storage system that includes a non-transitory, machine readable medium encoded with example instructions to create a primary ACL in response to a request of a secondary protocol to create an object.

FIG. 7 is a block diagram of an example storage system 700 that includes a processing resource 702 coupled to a non-transitory, machine readable medium 704 encoded with example instructions. The storage system 700 also includes a file store 705, which may be hosted on a storage device such as a hard disk drive, solid state drive, or the like, or a plurality of such storage devices (e.g., an array of disks). The processing resource 702 may include a microcontroller, a microprocessor, central processing unit core(s), an ASIC, an FPGA, and/or other hardware device suitable for retrieval and/or execution of instructions from the machine readable medium 704 to perform functions related to various examples. Additionally or alternatively, the processing resource 702 may include electronic circuitry for performing the functionality of the instructions described herein.

The machine readable medium 704 may be any medium suitable for storing executable instructions, such as RAM, ROM, EEPROM, flash memory, a hard disk drive, an optical disc, or the like. The machine readable medium 704 may be disposed within the system 700, as shown in FIG. 7, in which case the executable instructions may be deemed "installed" or "embedded" on the system 700. Alternatively, the machine readable medium 704 may be a portable (e.g., external) storage medium, and may be part of an "installation package." The instructions stored on the machine readable medium 704 may be useful for implementing at least part of the file store management engines and methods described herein.

As described further herein below, the machine readable medium 704 may be encoded with a set of executable instructions 706, 708. It should be understood that part or all of the executable instructions and/or electronic circuits included within one box may, in alternate implementations, be included in a different box shown in the figures or in a different box not shown.

Instructions 706, upon execution, cause the processing resource 702 to receive a request to create an object in the file store 705 of the storage system. The file store operates under a security mode associated with a primary protocol.

Instructions 708, upon execution, cause the processing resource 702 to respond to the request being of a secondary protocol in the following manner. Instructions 708 cause the processing resource 702 to create a primary ACL in a format native to the primary protocol based on a parent object identified by the request. Instructions 708 then cause the processing resource 702 to perform an atomic write operation that stores, to an extended attribute of the object and in the file store, a multi-protocol ACL containing the primary ACL and no secondary ACL. A secondary ACL is an ACL in a format associated with the secondary protocol and not native to the primary protocol.

In some implementations, the machine readable medium 704 may include additional instructions. For example, the machine readable medium 704 also may include instructions to process a first access request for the object via the secondary protocol, where processing the first access request includes creating the secondary ACL by conversion of the primary ACL to the format associated with the secondary protocol, and atomically writing, to the extended attribute, the multi-protocol ACL containing the primary ACL and the secondary ACL created from conversion of the primary ACL.

To convert the primary ACL, the instructions may convert an identity included in the primary ACL to an identity in the format associated with the secondary protocol. Identity conversion may include retrieval, from an identity translation cache of the storage system, of the identity in the format associated with the secondary protocol. If the identity cannot be retrieved from the identity translation cache, identity conversion may include a lookup of the identity in the format associated with the secondary protocol from a source external to the storage system and addition of conversion information from the lookup to the identity translation cache.

The machine readable medium 704 also may include instructions to generate an intermediate ACL to facilitate conversion between the primary ACL and secondary ACLs, and instructions to atomically write the intermediate ACL, the primary ACL, and the secondary ACLs together as the multi-protocol ACL into the extended attribute. The intermediate ACL may be useful for extensible support of additional protocols and ACL formats.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

We claim:

1. A method comprising:
    maintaining, by a storage system, a multi-protocol access control list (ACL) in an extended attribute of an object stored in a file store of the storage system, the multi-protocol ACL including a primary ACL in a format associated with a primary protocol of the file store and a secondary ACL in a format associated with a secondary protocol;
    restricting, by the storage system, modification of the multi-protocol ACL to modification of the primary ACL via the primary protocol; and
    synchronizing, by the storage system, modification of the primary ACL to the secondary ACL.

2. The method of claim 1, wherein the primary ACL includes an identity and permissions in the format associated with the primary protocol and the secondary ACL includes an identity and permissions in the format associated with the secondary protocol.

3. The method of claim 1, further comprising:
    receiving, by the storage system, a request via the secondary protocol to create the object; and
    responsive to the request and prior to the maintaining, creating, by the storage system, the multi-protocol ACL by:
        creating the primary ACL based on object creation rules of the primary protocol and a parent object identified by the request, and
        atomically writing to the extended attribute of the object the multi-protocol ACL containing the primary ACL and no secondary ACL.

4. The method of claim 3, further comprising:
    receiving, by the storage system, a first access request for the object via the secondary protocol, after the creating the multi-protocol ACL; and
    responsive to the first access request:
        creating the secondary ACL by conversion from the primary ACL, and
        atomically writing to the extended attribute of the object the multi-protocol ACL containing the primary ACL and the secondary ACL.

5. The method of claim 4, wherein the creating the secondary ACL by conversion from the primary ACL includes:
    converting an identity included in the primary ACL to an identity in the format associated with the secondary protocol by retrieving the identity in the format associated with the secondary protocol from a local cache, and
    translating permissions of the primary ACL to permissions in the format associated with the secondary protocol.

6. The method of claim 5, wherein if the identity in the format associated with the secondary protocol cannot be retrieved from the local cache, the converting the identity included in the primary ACL includes looking up the identity in the format associated with the secondary protocol from a source external to the storage system and adding conversion information for the identity to the local cache.

7. The method of claim 1, further comprising:
    receiving, by the storage system, an access request for the object via the secondary protocol; and
    responsive to the receiving, enforcing, by the storage system, the secondary ACL against the access request without converting the primary ACL.

8. A system comprising:
a hardware processor; and
a non-transitory computer readable medium storing instructions for a file store management engine, the instructions upon execution are to cause the hardware processor to:
   maintain a persistent multi-protocol access control list (ACL) in an extended attribute of an object stored in a file store, the multi-protocol ACL formatted to hold a primary ACL in a format associated with a primary protocol of the file store and a secondary ACL in a format associated with a secondary protocol,
   restrict modification of the multi-protocol ACL to modification of the primary ACL via the primary protocol, and
   synchronize modification of the primary ACL to the secondary ACL.

9. The system of claim 8, wherein the non-transitory computer readable medium stores instructions that, upon execution, cause the hardware processor to process a request received from a client device via the secondary protocol to create the object by:
   creation of the primary ACL based on object creation rules of the primary protocol and a parent object identified by the request, and
   an atomic write operation that stores, to the extended attribute of the object, the multi-protocol ACL containing the created primary ACL alone without a secondary ACL.

10. The system of claim 8, further comprising:
an identity translation cache to store identities in formats associated respectively with the primary protocol and the secondary protocol; and
wherein the non-transitory computer readable medium stores instructions that, upon execution, cause the hardware processor to process a request from a client device via a new secondary protocol to access the object when the multi-protocol ACL does not include an ACL in a format associated with the new secondary protocol by:
   conversion of the primary ACL to a new secondary ACL, including conversion of an identity included in the primary ACL to an identity in the format associated with the new secondary protocol by retrieval of the identity in the format associated with the new secondary protocol from the identity translation cache and, if the identity cannot be retrieved from the identity translation cache, by a lookup of the identity in the format associated with the new secondary protocol from an external source and addition of conversion information from the lookup to the identity translation cache, and
   an atomic write, to the extended attribute of the object, of the new secondary ACL together with pre-existing ACLs of the multi-protocol ACL.

11. The system of claim 10, further comprising a name resolution service executing on the hardware processor to perform the lookup, the name resolution service accessible from a kernel supporting the file store management engine.

12. The system of claim 11, wherein the name resolution service performs lookups to translate user identifier (UID) to user principal name (UPN), group identifier (GID) to UPN, security identifier (SID) to UPN, UPN to SID, UPN to UID, UPN to GID, UID to SID, GID to SID, SID to UID, and SID to GID.

13. The system of claim 8, wherein the multi-protocol ACL includes the primary ACL, the secondary ACL, and an intermediate ACL, and synchronization of modification of the primary ACL to the secondary ACL includes:
   implementation of the modification to generate a modified primary ACL,
   conversion of the modified primary ACL to a modified intermediate ACL,
   conversion of the modified intermediate ACL to a modified secondary ACL, and
   an atomic write, to the extended attribute of the object, of an updated multi-protocol ACL containing the modified primary ACL, the modified intermediate ACL, and the modified secondary ACL.

14. The system of claim 13, wherein the non-transitory computer readable medium stores instructions that, upon execution, cause the hardware processor to add support for a new ACL format by:
   a reformat of the multi-protocol ACL with additional space in the extended attribute to hold an ACL of the new ACL format,
   addition of a routine to convert from the new ACL format to a format of the intermediate ACL, and
   addition of a routine to convert from the format of the intermediate ACL to the new ACL format.

15. The system of claim 8, wherein the non-transitory computer readable medium stores instructions that, upon execution, cause the hardware processor to:
   receive, from a client device, an access request for the object via the secondary protocol; and
   responsive to the access request, enforce the secondary ACL in the extended attribute against the access request without conversion of the primary ACL.

16. The system of claim 8, further comprising an identity translation cache to store identities in formats associated with the primary protocol and the secondary protocol,
   wherein to synchronize modification of the primary ACL to the secondary ACL, the instructions cause the hardware processor to refer to the identity translation cache independent of external sources to process an identity-based modification.

17. A non-transitory computer readable medium storing instructions executable by a processing resource of a storage system, the non-transitory computer readable medium comprising:
   instructions to receive a request to create an object in a file store of the storage system, the file store operating under a primary protocol; and
   instructions to, responsive to the request being of a secondary protocol:
      create a primary access control list (ACL) in a format native to the primary protocol based on a parent object identified by the request, and
      perform an atomic write operation that stores, to an extended attribute of the object, a multi-protocol ACL containing the primary ACL and no secondary ACL.

18. The non-transitory computer readable medium of claim 17, further comprising instructions to process a first access request for the object via the secondary protocol by:
   creation of the secondary ACL in a format associated with the secondary protocol by conversion from the primary ACL, and
   an atomic write to the extended attribute of the multi-protocol ACL containing the primary ACL and the secondary ACL created from conversion of the primary ACL.

19. The non-transitory computer readable medium of claim 18, wherein the conversion of the primary ACL includes conversion of an identity included in the primary ACL to an identity in the format associated with the secondary protocol by:

retrieval from an identity translation cache of the storage system of the identity in the format associated with the secondary protocol, and if the identity cannot be retrieved from the identity translation cache, a lookup of the identity in the format associated with the secondary protocol from a source external to the storage system and addition of conversion information from the lookup to the identity translation cache.

20. The non-transitory computer readable medium of claim 17, further comprising instructions to generate an intermediate ACL to facilitate conversion between the primary ACL and secondary ACLs; and instructions to atomically write the intermediate ACL, the primary ACL, and the secondary ACLs together as the multi-protocol ACL into the extended attribute.

\* \* \* \* \*